J. JANES.
WOOD CARVING MACHINE.
APPLICATION FILED SEPT. 22, 1916.

1,299,350.

Patented Apr. 1, 1919.
9 SHEETS—SHEET 9.

Fig. 31

UNITED STATES PATENT OFFICE.

JOSEPH JANES, OF CAMBRIDGE, MASSACHUSETTS, ASSIGNOR, BY DIRECT AND MESNE ASSIGNMENTS, TO JANES WOOD CARVING CORPORATION, OF NEW YORK, N. Y., A CORPORATION OF NEW YORK.

WOOD-CARVING MACHINE.

1,299,350.  Specification of Letters Patent.  Patented Apr. 1, 1919.

Application filed September 22, 1916.  Serial No. 121,534.

*To all whom it may concern:*

Be it known that I, JOSEPH JANES, of Cambridge, in the county of Middlesex and State of Massachusetts, a citizen of the United States, have invented a new and useful Improvement in Wood-Carving Machines, of which the following is a specification.

My invention relates to machines for carving wood, especially to a machine which is capable of reproducing a pattern and at the same time a reverse of the pattern. It consists in its preferred embodiment in a machine in which two sets of rotary carving tools are used, one set on each end of the axis of a swinging frame, the tools of one set to reproduce the pattern and the tools of the other set to produce the reverse thereof. This frame is mounted on a carriage reciprocated by any known means whereby the frame and tools are carried from one end of the work to the other and back again as many times as are necessary, the frame being automatically fed crosswise of the work (*i. e.*, vertically in the machine shown) between changes of direction of movement of the carriage so that all parts of the work will be cut by the tool. In the drawings eight tools are shown, but the machine may be fitted for a greater or less number. The tools automatically change their position with relation to the work at the end of each trip of the carriage so that when cutting they are always in the same relation to the direction of movement of the carriage. Means are also preferably provided for adjusting the work holder toward and from the carriage to compensate for the thickness of the stock to be carried, and the machine is preferably automatic so that it will require practically no attention from the operator except to put the stock in place and remove it when finished.

My invention will be understood by reference to the drawings in which it is shown in its preferred form.

The frame of the machine comprises a base A having uprights $A^1$, top beams $A^2$ and cross-beams $A^3$ which connect the top beam $A^2$. On the cross-beams $A^3$ is mounted in suitable straps the main shaft $A^4$ having two loose pulleys $A^5$ and a fast pulley $A^6$.

The main shaft is operated by two belts (not shown), one a cross-belt to reverse the direction of movement of the shaft, the construction being the well known construction in which one of the belts is riding on one of the pulleys $A^5$ while the other belt is turning the pulley $A^6$. By this means the shaft $A^4$ can be rotated in either direction and the direction of movement of the carriage reversed.

Figure 3:
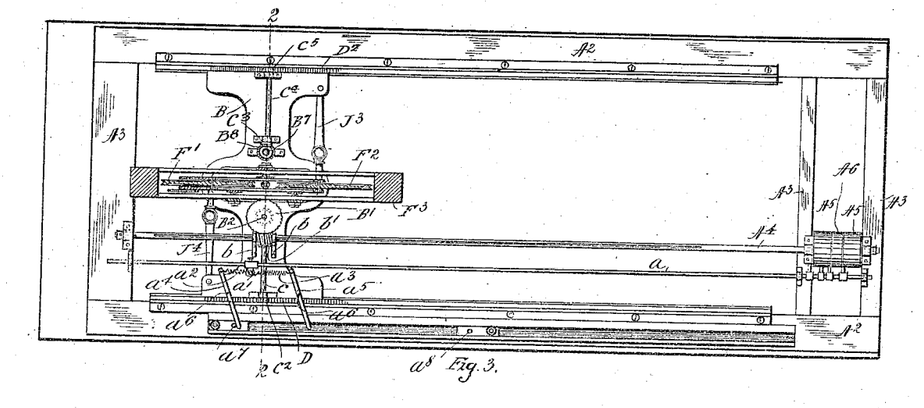
Fig. 3 is a plan, the upper portion being in section on line 3—3 of Fig. 1.

$a$ is a belt shipper of ordinary construction running for convenience the length of the machine so that at its farther end it may be operated by hand, but also carrying an adjustable finger $a^1$ which is attached by means of springs $a^2$, $a^3$ to levers $a^4$, $a^5$ pivoted at $a^6$, $a^6$ to the plate B forming part of the carriage which carries the tools (see Fig. 3).

This carriage, the details of which will be described below, travels from approximately one end to the other of the machine, and on one of the top beams $A^2$ are pins $a^7$, $a^8$. As shown in Fig. 3 the pin $a^7$ has engaged the lever $a^4$ during the leftward movement of the carriage and has expanded the spring $a^2$. When the stress of the spring becomes great enough it will pull the shipper $a$, thus transferring the belt, which was on the pulley $A^6$ onto one pulley $A^5$ and transferring the belt on the other pulley $A^5$ onto the pulley $A^6$, thus reversing the operation of the main shaft $A^4$.

The plate B has on it two straps $b$ between which is a worm $b^1$ mounted to slide on the main shaft $A^4$ which is grooved for the purpose so as to enable the carriage to move lengthwise of the machine in either direction carrying the worm with it. The worm $b^1$ meshes with a worm gear $B^1$ mounted on the top of a shaft $B^2$ running down through the plate B to a similar plate $B^3$ which forms the bottom of the carriage. On the upper end of the shaft $B^2$ is a beveled gear $B^4$ which meshes with a beveled gear C on the end of a shaft $c$ mounted in bearings in the plate B. At the bottom of the shaft $B^2$ is a similar beveled gear $B^5$ which meshes with a beveled gear $C^1$ on a shaft $c^1$ mounted in bearings on the under side of the plate $B^3$. On the farther end of the shaft $c$ is a pinion $c^2$ which meshes in a rack D running lengthwise of the top of the machine. The shaft $c^1$ carries a similar pinion $c^3$ engaging with a rack $D^1$ on the base A of the machine. The shaft $c^1$, mounted like shaft $c$ in bearings on the plate $B^3$, also carries a beveled gear $C^2$ which meshes with a beveled gear $B^6$ on the lower end of a shaft $B^7$ which has at its upper end a beveled gear $B^8$ meshing with a beveled gear $C^3$ on the end of a shaft $c^4$ carrying at its outer end a pinion $c^5$ in mesh with the rack $D^2$ on top of the machine and running parallel with the rack D. The shaft $c^1$ carries a pinion $c^6$ on its farther end which engages a rack $D^3$ mounted on the base of the machine parallel with the rack $D^1$. The top plate B of the carriage is provided at each end with a side track $b^x$ on a plate $D^4$ on which the rack $D^2$ rests.

The shafts $B^2$ and $B^7$ are housed in tubular supports $B^9$ and $B^{10}$ carrying suitable bearings at their upper and lower ends to center the shafts in these tubes (see Fig. 5), these tubes also serving as means for connecting the upper plate B with the lower plate $B^3$. As shown the plates B and $B^3$ are provided with clamps, in which the tubes $B^9$ and $B^{10}$ are held. The clamps holding the upper ends of the tubes are marked $B^{11}$ and those holding the lower ends of the tubes are marked $B^{12}$, these latter clamps being spaced by a brace $B^{13}$ which carries one of the bearings for the shaft $c^1$ and is cup-shaped for purposes described below. In addition the lower plate $B^3$ is provided with rolls $b^2$ which run on tracks $b^3$ to reduce the friction.

It will be seen that the rotation of the main shaft $A^4$ will by this train of gears move the carriage from the position shown in Fig. 3 to the right until the lever $a^5$ engages the pin $a^8$, when the belts being shipped, the carriage will be moved back again, this being caused by the action of the pinions $c^2$, $c^3$, $c^5$ and $c^6$ upon the racks D, $D^1$, $D^2$ and $D^3$.

Figure 21:
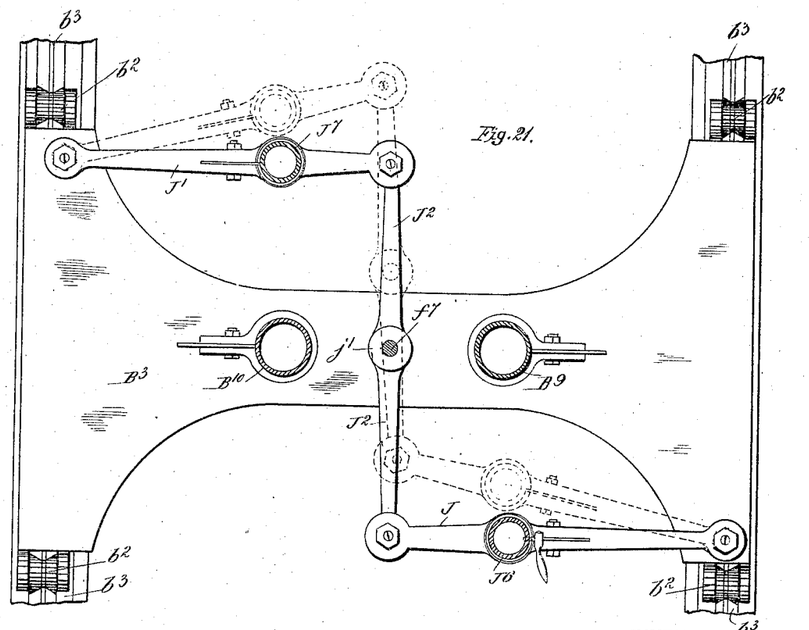

The carriage comprises the upper and lower plates B and $B^3$ connected together by the tubular supports $B^9$ and $B^{10}$ as described. On the plate $B^3$ are pivotally mounted two swinging brackets J, $J^1$ connected together by a link $J^2$, and from the plate B are hung two similar brackets $J^3$, $J^4$ connected together by a link $J^5$. Connecting the brackets J and $J^3$ is a post $J^6$ and connecting the brackets $J^1$ and $J^4$ is a post $J^7$. Thus a frame is formed which, as will be seen from Fig. 21, is capable of a horizontal swinging movement.

F, $F^{10}$, $F^{20}$, $F^{30}$ are motors by which the tools are rotated, one motor being provided for each pair of tools. The motors are supported between a pair of suitably shaped vertical plates $f$ which are held together by bolts $f^1$ and form a housing having top and bottom pieces $f^2$, $f^3$. From the top piece $f^2$ projects a post $f^4$ carrying cords $f^5$ which pass up over wheels $F^1$, $F^2$, their ends being attached to a weighted frame $F^3$ which forms a counterweight to the motors and tools and carries rolls $f^6$ which run on vertical tracks $f^{61}$ engaging the outer walls of the frame $F^4$ in which the wheels $F^1$, $F^2$ are mounted. The plate B has an opening through which the cords $f^5$ pass and through which the post $f^4$ may rise when necessary. The post $f^4$ passes through a bearing $j$ in the link $J^5$. From the bottom $f^3$ of the housing projects a post $f^7$ which passes down through a similar bearing $j^1$ in the link $J^2$, both of these bearings $j\ j^1$ having anti-friction balls so that the housing may be moved vertically with the least amount of friction. To allow the post $f^7$ to have the necessary movement, the connection between the clamps $B^{12}$ is cup-shaped as at $B^{13}$. This mounting allows the tool carrier to turn on a vertical axis and allows the tools a great freedom of movement which may be given by hand. If the machine is to be used automatically, a strap $j^8$ is attached to one of the posts, say $B^9$, and the adjacent post $J^7$ of the plate B.

The frame $F^4$ is supported by extensions $J^{61}$ and $J^{62}$, $J^{71}$ and $J^{72}$ of the posts $J^6$ and $J^7$. The extensions $J^{61}$ and $J^{71}$ project laterally from the posts $J^6$ and $J^7$ just above the plate B and support the bottom of the frame $F^4$, while the extensions $J^{62}$ and $J^{72}$ project upwardly and laterally to support the top of the frame to which they are suitably attached. The extension $J^{62}$ is in all respects like the extension $J^{72}$ and performs the same function. Its supporting end is shown in Fig. 1.

The counterweight $F^3$ bridges the frame $F^4$ and its braces $F^5$ carry the rolls $f^6$. Each wheel $F^1$ and $F^2$ is grooved on its periphery to receive one of the cords $f^5$, one of them $F^1$ engaging also a pinion $f^8$ mounted on a stud on an extension $F^5$ of the frame $F^4$ (see Figs. 23 and 24). On the stud and fast to the pinion is a ratchet $f^9$ which is engaged by a holding pawl $f^{10}$ also mounted on the extension $F^5$.

On the extension $F^5$ is also fulcrumed a lever $f^{11}$ on which is pivotally mounted a hook-shaped pawl $f^{12}$ which also engages the ratchet $f^9$ and is maintained in proper relation to the lever $f^{11}$ by the spring $f^{13}$, this construction being such that upon depressing the farther end of the lever $f^{11}$ the pawl $f^{12}$ is pushed so that it will give a partial turn to the pinion $f^8$ and cause a partial rotation to the wheel $F^1$ and allowing the counterweight to act so that the motor frame will be lifted a short distance. To adjust this distance there is mounted on one of the crossbeams $A^3$ a slotted upright $f^{14}$ to which is attached by a clamp nut $f^{15}$ a horizontal slotted piece $f^{16}$ having an arm $f^{17}$ at an angle thereto. This construction allows the piece $f^{16}$ to be adjusted in or out or up or down, thus changing the position of the arm $f^{17}$. This arm is located to engage the outer end of the lever $f^{11}$. The amount of rotation given to the wheels will depend upon the location of the arm $f^{17}$ with relation to that of the belt shifter. A slight depression of the lever $f^{11}$ will cause the rotation of the ratchet $f^9$ a single tooth while a greater depression of the lever $f^{11}$ will turn the ratchet a greater distance, this operation taking place just as the belt is shipped to change the direction of the carriage.

Figure 1:
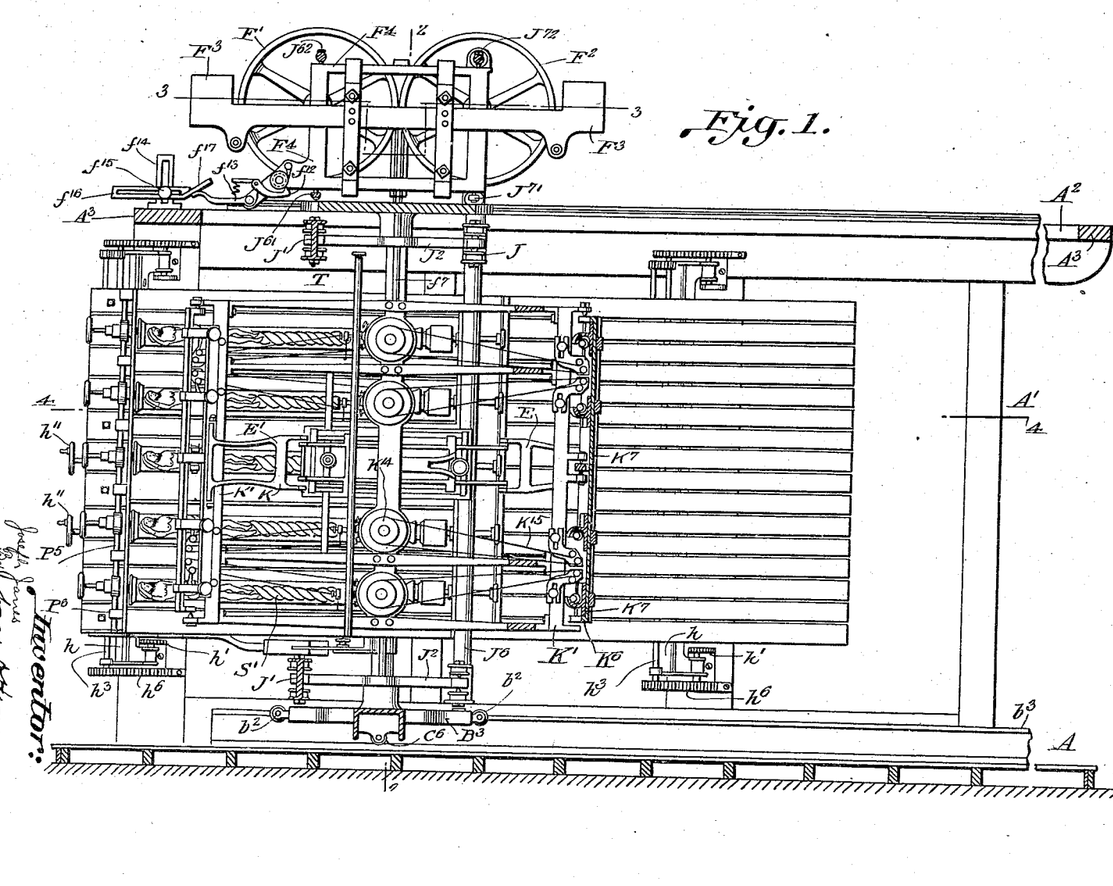
Figure 1 is a section on line 1—1 of Fig. 2.

In practice the complete trip of the carriage is from one end of the machine, say the left end in Fig. 1, to the other end, when the belts are automatically shipped. It is then returned over the same line after which the tool carrier is raised by the above mechanism, say 1/32 of an inch, and the belts being shipped again, the carriage makes another trip, etc.

As shown there are four electric motors F, $F^{10}$, $F^{20}$, $F^{30}$, of ordinary construction, each motor belted to two tools to rotate them. Between the motors $F^{10}$ and $F^{20}$ there is located a rectangular frame L which carries two adjustable centers $l$, the upper one of which pivotally engages the motor $F^{10}$ and the lower one bears on the top of the motor $F^{20}$.

A plate $L^1$ is fixedly supported on the post $B^{10}$ opposite the frame L and the frame L carries two adjustable bearing screws $l^1$ which engage the plate $L^1$ so that the plate and frame may be maintained in parallel relation.

The frame L also carries parallel rods $L^2$ on which slides a rectangular frame M on each end of which are supported by pivots $m$ the tool arms $E^1$.

The centers $l$ afford a vertical axis for the frame L so that it may swing or oscillate on a horizontal plane only, being maintained in a horizontal position by its vertical axis; and the frame M, which carries the tool supports and pattern follower, is held rigid with said frame L by the rods $L^2$, so that while it can slide longitudinally relative to said frame L it cannot move otherwise relative to said frame L, and said frame M will thus be maintained in a constant horizontal position.

To the housing $f$ is attached a series of curved arms K, one located on each side of the housing and preferably connected by braces $k$. $K^1$ are uprights to which the ends of the arms K are connected to form a frame on which the tools E are mounted (see Figs. 6 and 7).

Figure 19:
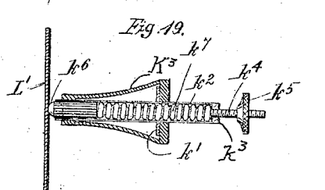
Fig. 19 is a section on line 19—19 of Fig. 7.
Figure 20:
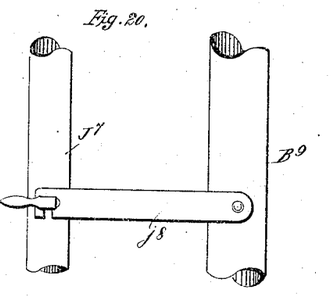
Figs. 20 and 21 are details showing portions of the carriage.

The housing $f$ carries a leaf spring $k^1$ which has at its outer end a pressure support shown in detail in Fig. 19 and, comprising a casing $K^3$ to which is attached a tube $k^2$ which passes out through the casing $K^3$. The outer end of the tube is closed by a head as at $k^3$. Through this head passes a rod $k^4$ threaded at its outer end, and carrying a thumb nut $k^5$. The farther end of the rod is enlarged and preferably carries a ball bearing $k^6$ which engages the plate $L^1$. Between the enlarged end of the rod $k^4$ and the head $k^3$ is a spiral spring $k^7$. The tendency of the leaf spring $k^1$ is to throw the tool frame in the direction of the work. The purpose of the spiral spring $k^7$ is to coöperate with the plate L, and the leaf spring $k^1$ to maintain the tools in yieldable relation to the work and pattern so that the tools will adapt themselves to the depth and shallowness of the pattern, the thumb nut $k^5$ being to adjust the tension of the spring $k^7$.

In addition an adjustable stop $K^5$ is provided which passes through a vertical bar $K^4$ connecting various arms K. It is adapted to engage the plate L and serves as a stop to limit the movement of the parts controlled by the spring $k^1$ and so prevent the cutters from cutting too deep. It is of usual construction, being provided with a clamp nut to clamp it in place when once set.

The tools and their holders will be understood from Figs. 13 to 18, in which one is shown in detail. They are all alike and each comprises a housing $e$ supported to swing in a holder $e^1$. Within the housing is a tool holder $e^2$, a portion of which is preferably slightly smaller in diameter than the interior of the housing to form a lubricating chamber $e^x$. Its middle portion is threaded and carries a nut $e^3$ which is provided with spanner holes $e^6$ by which it may be adjusted to adjust the position of the tool shank in the holder. It is mounted in ball bearings $e^5$ of ordinary construction held within the walls of a pulley chamber $e^4$. To the nut is attached a pulley $e^7$ by which connection is made by a belt with one of the motors to rotate the tool. The rear end of the shank is somewhat enlarged as at $e^8$ and grooved longitudinally as at $e^{25}$, and the shank has a central passage $e^9$ running through it from its rear to a point at $e^{10}$ in front of the threaded portion of the shank where the shank is reduced in diameter and the passage is connected at one or more points with the chamber about the shank $e^x$. The rear of the housing is closed by a threaded plug comprising a tubular member $e^{11}$ threaded on both interior and exterior, conical at its inner end and provided with an opening therethrough and forming a lubricating reservoir within which a lubricant may be placed. A screw feed is provided controlled by a thumb head $e^{12}$ from which projects a threaded closure $e^{13}$ and a rod $e^{14}$ square in cross section which passes through a packing washer or piston $e^{17}$ having a corresponding opening in it. The lubricant is placed in the member $e^{11}$ which is screwed home. The piston is then screwed into place by the rod $e^{14}$ and thumb head $e^{12}$, the piston being advanced toward the conical end of the tubular portion $e^{11}$ by turning the thumb head $e^{12}$ to give sufficient pressure to the lubricant. The rear end of the shank of the tool holder $e^2$ is recessed to receive the inner end of the tubular member $e^{11}$ which is conical, the opening in its end registering with the end of the passage $e^9$ so that the lubricant will be distributed in the chamber $e^x$ in the housing $e$.

Figures 13, 14, 15, 16, 17, 18:
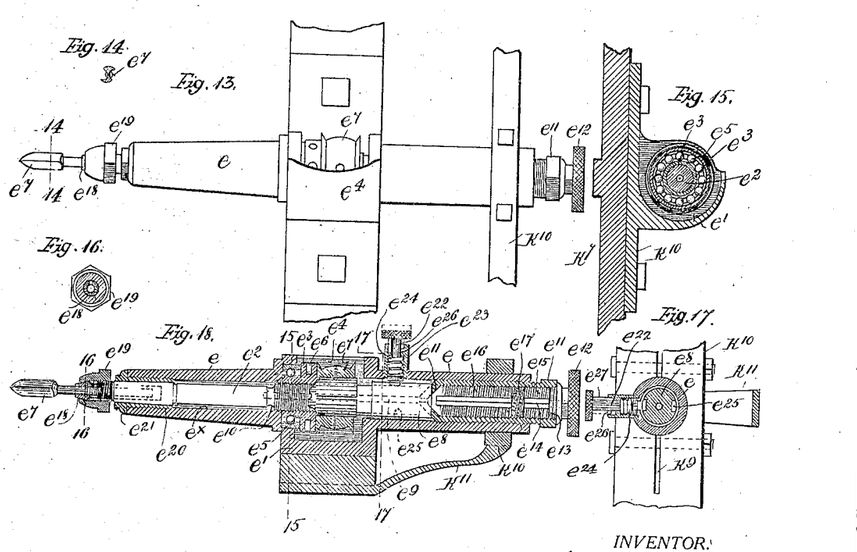
Fig. 13 is a side elevation showing the tool mounting.
Fig. 14 is a section on line 14—14 of Fig. 13.
Figs. 15, 16 and 17 are sections on lines 15—15, 16—16 and 17—17 of Fig. 18.
Fig. 18 is a longitudinal section of the tool mounting.

One form of tool $e^y$ is shown in cross section in Fig. 14 and in side elevation in Figs. 13 and 18. Its shank sets into a split end of a tube $e^{18}$ in which it is clamped by the nut $e^{19}$. $e^{20}$ is a bushing which is screwed into the end of the housing $e$ and is held in place by a nut $e^{21}$. Its interior is conical to fit the conical end of the tool holder $e^2$, this construction enabling the tool holder to be adjusted by the nut $e^3$ to take up the wear.

To prevent the tool holder from turning when removing and inserting a tool, a spring pin $e^{22}$ is provided in a housing $e^{23}$, which when under the influence of the spring $e^{24}$ engages one of the grooves $e^{25}$ (of which there are several) in the tool holder $e^2$, but which is normally withdrawn out of the slot to allow the tool holder to rotate. A shoulder $e^{26}$ within the housing $e^{23}$ is adapted to support a projection $e^{27}$ on the pin $e^{22}$ and hold the pin out of the slot $e^{25}$ so that the tool may be rotated, this construction being well known.

The uprights $K^1$ have centers $K^6$ between which are supported bars $K^7$ carrying the housings $e^1$. Clamps $K^9$ are provided in a second bar $K^{10}$ which hold the rear end of the housings $e$ and which are connected to the bar $K^7$ by brackets $K^{11}$.

On the bar $K^1$ are a series of adjustable brackets $K^{12}$, each carrying a pair of pulleys $K^{13}$ over which and the motor pulleys $K^{14}$ and the pulleys $e^7$ on the tools, pass the belts $K^{15}$ by which the tools are rotated. By this means the tension of the belts may be adjusted.

Figure 2:
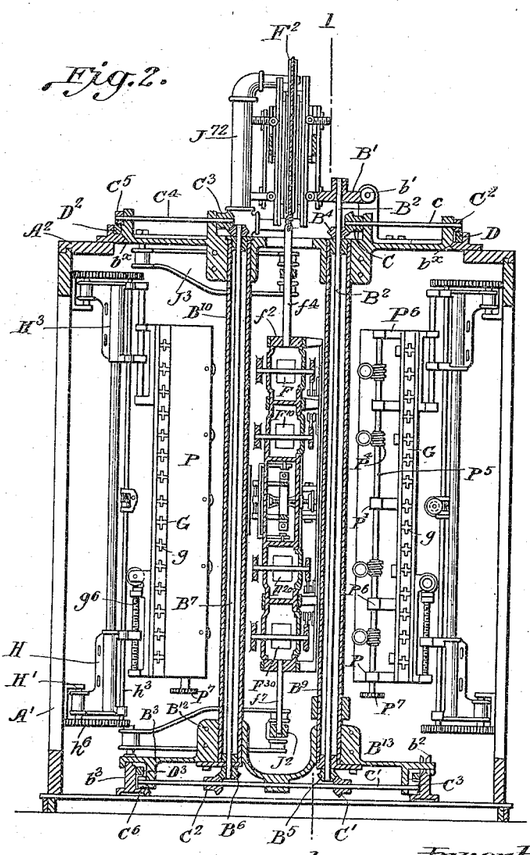
Fig. 2 is a section on line 2—2 of Fig. 1.
Figure 5:
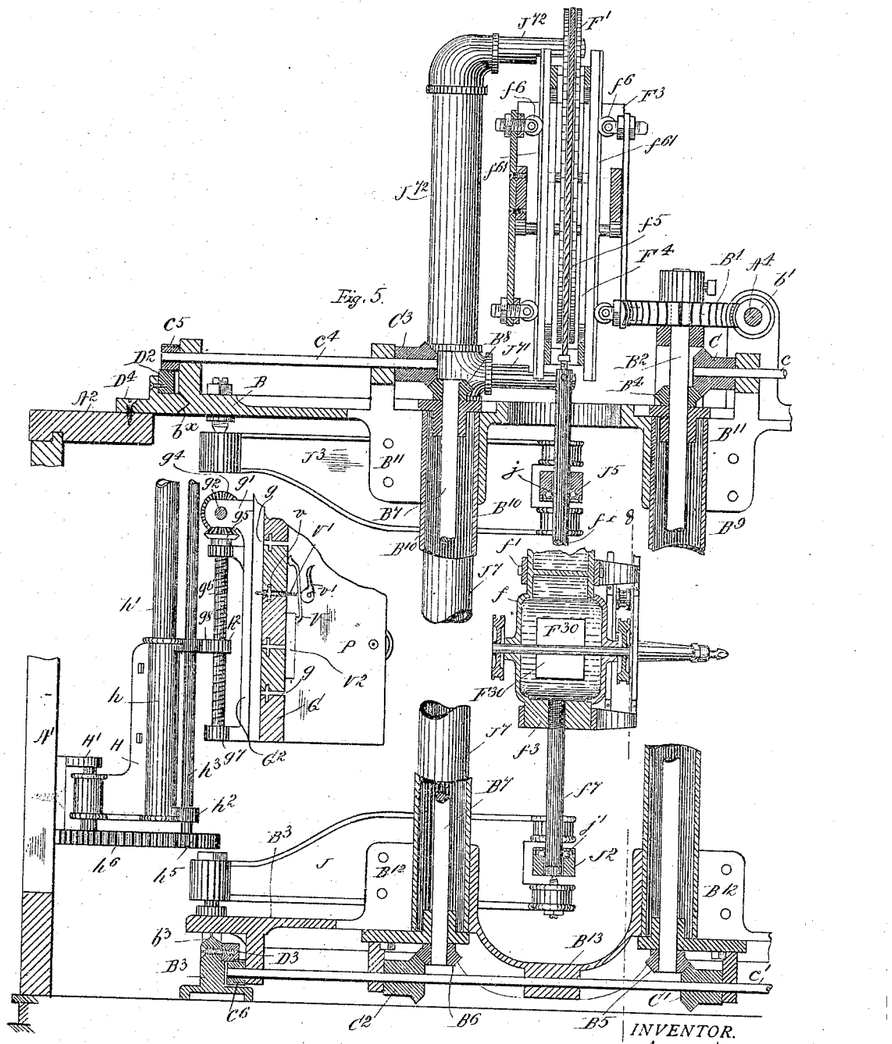
Fig. 5 shows enlarged sectional details of the carriage as shown in Fig. 2.
Figures 22, 23, 24, 25, 26, 27, 28, 29, 30:
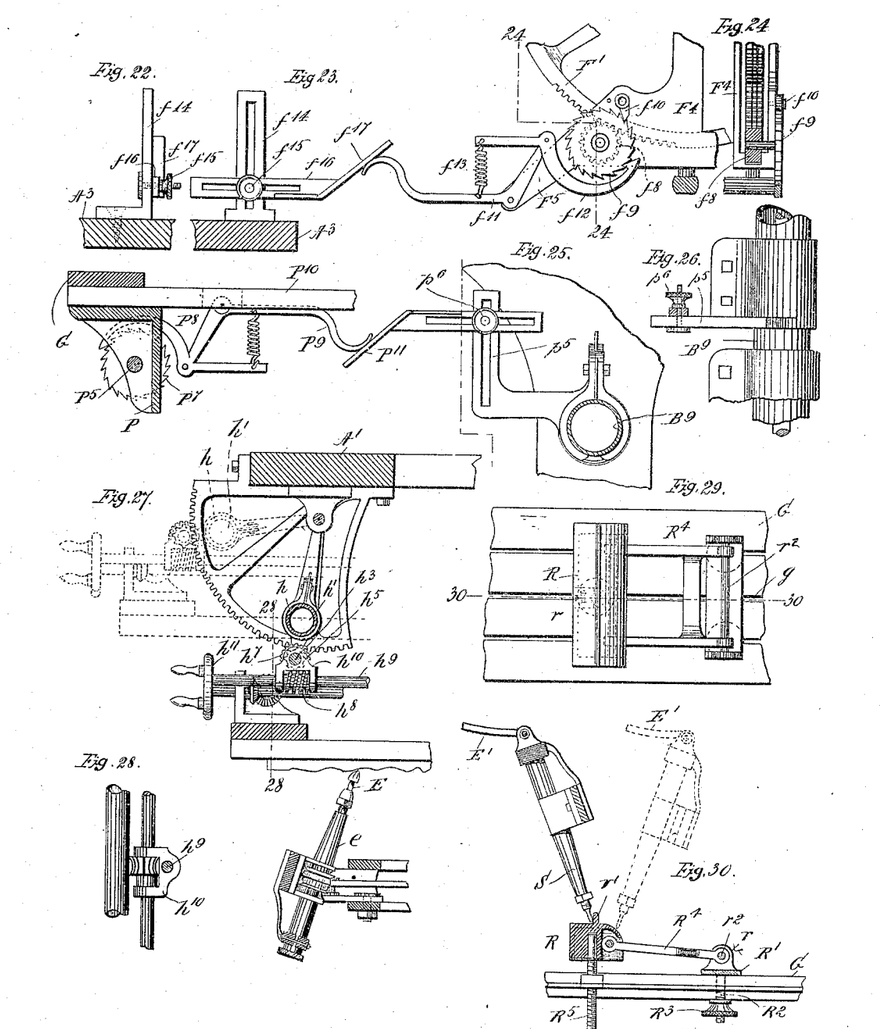
Fig. 22 is an end view.
Fig. 23 a side elevation of a portion of the change-over mechanism.
Fig. 24 is a section on line 24—24 of Fig. 23.
Fig. 25 shows a portion of the means for rotating the chuck of Fig. 11.
Fig. 26 is a detail thereof in side elevation.
Fig. 27 is a section showing the table-adjusting mechanism.
Fig. 28 is a section on line 28—28 of Fig. 27.
Fig. 29 is a plan of the means for turning the tools at the end of the carriage travel.
Fig. 30 is a section on line 30—30 of Fig. 29.
Figure 31:
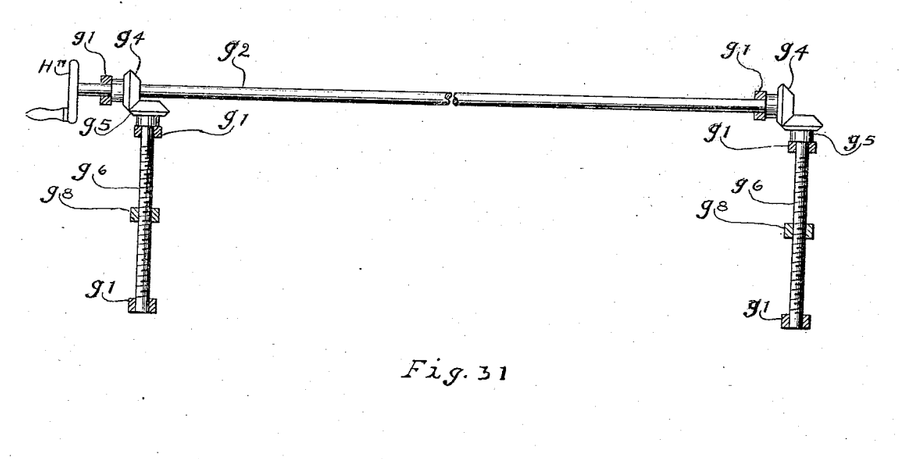
Fig. 31 is a detail view illustrating the mechanism for raising and lowering the work-supporting tables.

The work is supported in the manner usual in wood carving machines upon tables G, $G^1$, each table being grooved as shown at $g$ in Fig. 5, to enable clamps to be adjustably provided according to the width of the stock to be carved. Each table also has a bracket P, $P^1$ at each end extending from the bottom to the top thereof, the brackets $P^1$ being adjustable lengthwise of the tables. The tables are opposite each other and arranged so that the work may be reached by the tools on both bars $K^7$. Two forms of clamp are shown, one in Fig. 5 and the other in Figs. 9 to 12, inclusive, where the clamps are in the form of chucks for rotary work. The tables G and $G^1$ are both alike and are supported and adjusted as shown in Figs. 2, 5 and 27. As shown in Fig. 5 a bracket H is hung on a center $H^1$ supported upon one of the uprights $A^1$. It will be noted that there are four of these brackets, one at each end of each table. Above each bracket H is a bracket $H^3$ to hold the upper ends of each table. Both sets of brackets H and $H^3$ have sockets $h$ between which are supported rods $h^1$, and both sets of brackets have bearings $h^2$ through which runs a shaft $h^3$ carrying at each end a pinion $h^5$ which meshes with a quadrant rack $h^6$. This rack is mounted on one of the uprights $A^1$, and it will be seen from Fig. 27 that the rack being fast, the rotation of the pinion will cause the tables to be moved toward or away from the uprights $A^1$, that is, toward or from the tool carriage. To turn the shafts $h^3$ I provide on each shaft $h^3$ a worm gear $h^7$ which meshes with a worm $h^8$ on shaft $h^9$ suitably supported in bearings $h^{10}$ loose on shaft $h^9$ and having a hand wheel $h^{11}$ at its outer end. By turning this hand wheel the shafts $h^3$ will be turned and the pinions $h^5$ will travel around the quadrant (see Fig. 27).

To raise or lower the tables I attach to each end of each table G, $G^1$ a bracket $G^2$, $G^3$. The lower bracket $G^2$ of each table has a bearing $g^1$ through which passes a shaft $g^2$. This shaft $g^2$ has two bevel gears $g^4$, one near each end, which mesh with bevel gears $g^5$ on vertical threaded shafts $g^6$, which are also mounted in bearings $g^7$ on one of the lower brackets $G^2$. This construction will be understood from Fig. 5 in which one shaft $g^6$ is shown together with the gears $g^4$, $g^5$ and the shaft $g^2$. This mechanism is repeated at the farther end of each table and, as it is a known construction, the arrangement of the mechanism at the other end of the tables is not shown in the drawings. The bracket H has in addition to the bearings $h^2$ a bearing $g^8$ which is threaded on its interior to coöperate with the threaded shaft $g^6$. Thus by turning the hand wheel $g^3$ the shaft $g^6$ will be turned and the table raised or lowered as the case may be.

The clamp shown in Fig. 5 comprises a slide pin $V^1$ having a head which runs in the longitudinal portion of the groove $g$, its ends projecting from the groove in each direction. This slide pin $V^1$ carries a cam handle $v^1$ pivoted to its outer end and a spring member V shaped to engage both the table and the work. The work being put in place and a series of these clamps being arranged in the proper grooves, the cam handles are turned to clamp the work against the table. In this view $V^2$ is the work. The number of clamps used will depend on the length of the work.

In Figs. 1, 4 and 9 to 12 are shown the means by which round work is held and rotated so that it may be carved on all sides. For this purpose the bracket P has a series of bearings $p$ (see Fig. 11) in each of which is a sleeve $p^1$ threaded on its interior and provided with longitudinal slots $p^2$ or otherwise. Its exterior is also threaded to engage a clamping nut $p^3$ by which it may be clamped to a threaded spindle $p^4$ which runs within it and carries at its outer end a chuck $P^2$. On each sleeve $p^1$ is a worm gear $P^3$ which meshes with a worm $P^4$ on the shaft $P^5$ suitably supported in bearings $P^6$. The chuck $P^2$ and consequently the work supported at one end thereof is turned by turning the shaft $P^5$.

The shaft $P^5$ has at one end (see Fig. 25) a ratchet $P^7$ which is engaged by a spring-controlled pawl $P^8$ mounted on a lever $P^9$ attached to a projection $P^{10}$ supported from the table G. The outer end of this lever is hook-shaped and is located to engage a slanting stop $P^{11}$ adjustably supported from the tubular post $B^9$, by means of a slotted clamp $p^5$ to which the stop $P^{11}$ is adjustably attached by a clamp screw $p^6$, so that the amount of rotation of the shaft $P^5$ may be adjusted according to the desired amount of rotation to be given the work. With each trip of the carriage the shaft $P^5$ is rotated. This mechanism is similar in all respects to the mechanism for raising and lowering the tool frame and hence will not be further described. With rotary work the tool frame will be maintained at a constant level.

Figures 9, 10, 11, 12:
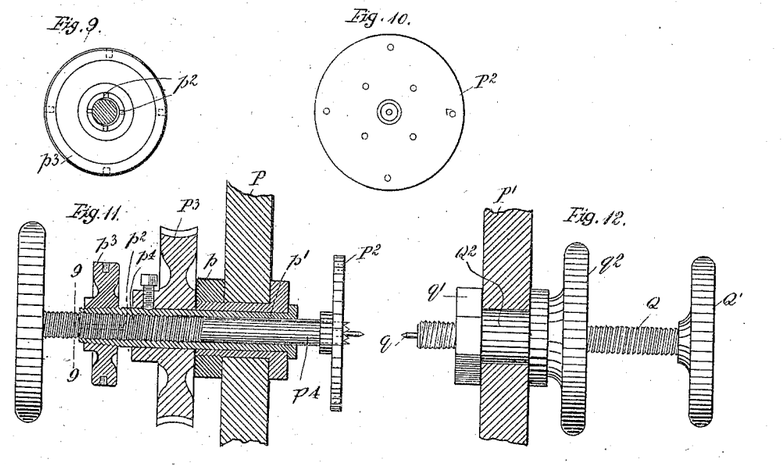
Fig. 9 is a section on line 9—9 of Fig. 11.
Fig. 10 is the face view of a rotary chuck or work holder chuck.
Fig. 11 a section showing the mounting of the chuck.
Fig. 12 is a side elevation of the opposing chuck.

The face of the chuck $P^2$ is shown in Fig. 10. It is provided with screw holes so that a large piece of work may be screwed thereto if necessary. Opposite the chuck is a long screw Q having a handle $Q^1$ at one end and a point $q$ at the other. A bearing $Q^2$ with an internal thread is set into the adjustable bracket $P^1$. The screw is adjusted so as to clamp the work between the point $q$ and the chuck $P^2$. Set nuts $q^1$, $q^2$ hold the screw when properly adjusted.

Figure 4:
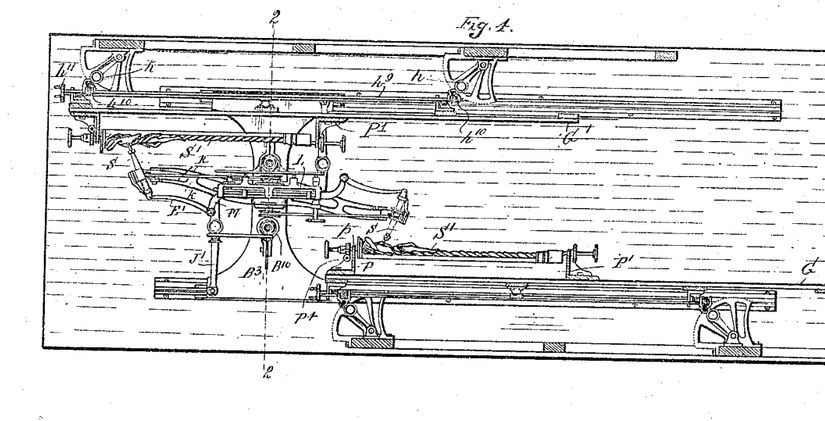
Fig. 4 is a longitudinal section on line 4—4 of Fig. 1.

The position of the tools with relation to the work is shown in Fig. 4 where it will be noted that the tools, as it were, are dragged over the work while they rotate, that is, they point slightly in a reverse direction to that in which the carriage is moving. It therefore becomes necessary at the end of the travel of the carriage in one direction to change the angle of the tools. It is for this purpose that the frame M is caused to slide on the rods $L^2$. This change of direction is caused by a trip R which is adjustably mounted at the proper point in one of the slots in one of the tables (see Figs. 29 and 30). As the location of this trip is directly under the work-holding mechanism it cannot be shown in the assembled drawings. It comprises a clamp $R^1$ having shanks $R^2$ each of which passes through one of the slots $g$ in the table, and each carries a thumb nut $R^3$ which runs on the threaded end of the shank. The other member of the clamp is a plate which rests against the table and has lugs $r$ which are connected by a pin $r^2$. On this pin $r^2$ is a link $R^4$ by which the clamp is pivotally connected to the trip R. The trip is mounted on a screw $R^5$ so that its position may be adjusted toward or from the table as required. Upon the trip is a rib $r^1$ adapted to engage a follower S. The follower is pivotally mounted in the tool frame like the tools and parallel with the tools above and below it on the same side of the axis of the tool carrier. It coöperates with a pattern $S^1$ which is mounted on the table $G^1$ preferably between the upper and lower sets of tools, the pattern being clamped to the table in a manner similar to the work.

In operation, as the carriage is moved to the right (see Fig. 1) the follower is dragged over the pattern and as the support for the follower is connected by the uprights $K^1$ with the tool frame it compels the tools to move over the work and carve it in conformity with the pattern. It will be noted that the tools above and below the follower, engaging the work on the table $G^1$, will reproduce the pattern exactly, while the tools on the other side of the axis of the carrier will produce the reverse of the pattern, engaging as they do the work on the opposite table G. This is one important feature of my invention for reasons which will appear to those skilled in the art, and so far as I know it is new with me.

The trip R is so located on its table $G^1$ that its rib $r^1$ will engage the follower, and the further movement of the carriage will push the outer end of the follower handle until the follower and consequently all the tools will assume the proper angle to engage the work on the return movement of the carriage and at this moment the change of direction in the movement of the carriage will begin, this being caused by the shipping of the belts on the pulleys $A^5$, $A^6$.

Figure 6:
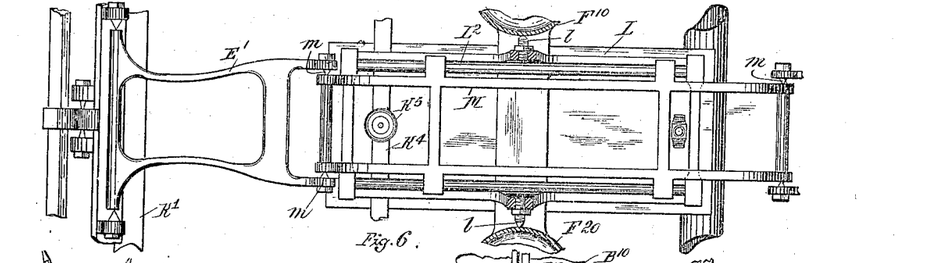
Fig. 6 is a section on line 6—6 of Fig. 7.
Figure 7:
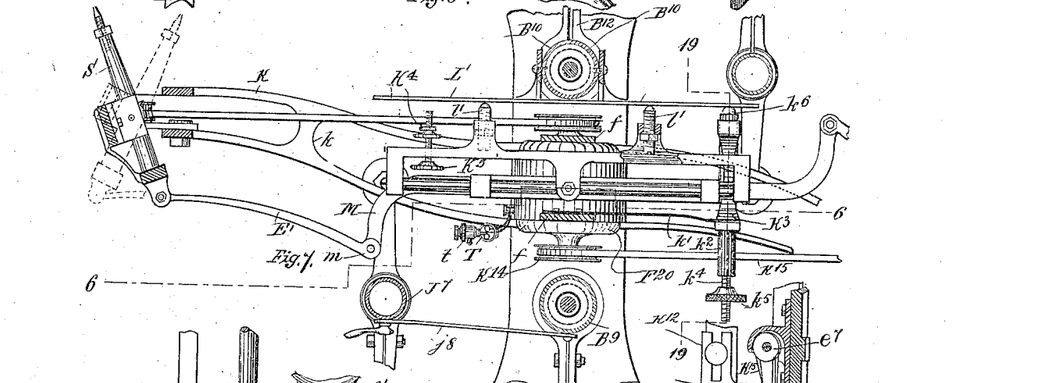
Fig. 7 is a top view of a portion of the tool-carrying frame taken above the middle of the machine and showing the follower.
Figure 8:
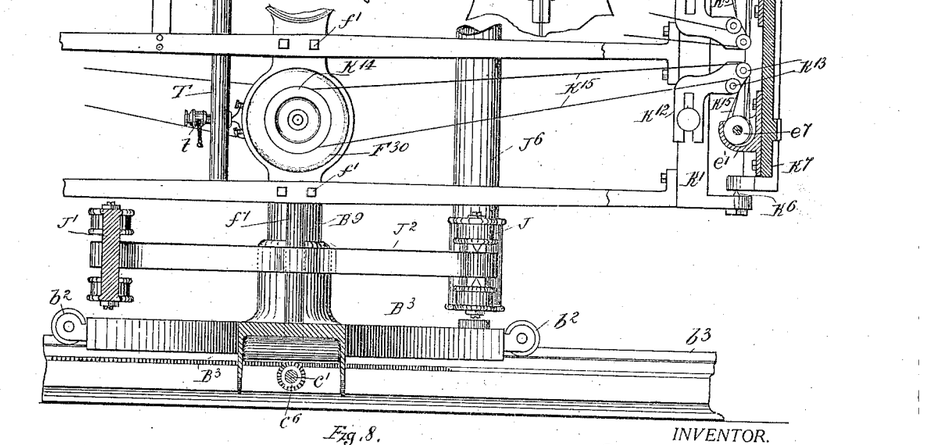
Fig. 8 is a side elevation showing the lower motor and including the other end of the frame. In both these views portions of the machine are shown in section.

As the several arms $E^1$ to which the follower and tools are connected are themselves connected to the frame M, this action will cause the frame to slide along the rods L from a position, say at the right in Fig. 6, to a corresponding position at the left in Fig. 6.

The motors as shown are electric motors, and T is a tube suitably mounted in connection with the motors through which the wires connecting the motors with their source of power are carried, $t$ being the circuit controllers by which the wire of each motor may be connected with the source of power.

It is believed from the above description of the mechanism that the operation of the machine will be understood. The work and pattern being put in place and power being applied, the carriage as a whole is reciprocated on the tracks $b^3$ and the frame carrying the follower and tools being adjusted to exert proper pressure against the pattern and work, the carriage moves until the follower has engaged with the trip and the belts have been shifted. The engagement of the follower with the trip gradually throws over the tools so that they assume their returning position, when the work goes on as before. When the carriage has reached its initial position the mechanism for lifting the tool carrier slightly operates, so that when the follower and tools next traverse the work they do so along a line say 1/32 of an inch above the line of their previous travel.

While the above is the description of a machine embodying my invention in the best form now known to me, I do not mean to confine myself to the exact construction shown except as defined by the claims as other embodiments of its subject-matter will occur to those skilled in the art.

As referred to above, a most important feature of my invention is its ability to reproduce a pattern and its reverse at the same time. This is of course owing to the fact that the blanks to be carried are mounted on tables facing each other and each pair of carving tools is mounted on the opposite ends of an arm supported at its center so that it may oscillate, one tool carving the blank mounted on one table and the other the work mounted on the opposite table.

To make this point clearer it may be stated that the blocks to be carved are placed on the opposing tables which, while adjustable, when once adjusted are stationary. The tool frame is fixed so that it does not turn on a horizontal axis. The carving then begins by running the follower over the pattern in a horizontal line and the tools horizontally over the blanks. When the end of the line is reached they run back and the frame is lifted 1/32 of an inch when the operation is repeated.

Referring to Fig. 4, and considering one figure $S^1$ as the pattern, it will be seen that the bent leg of the figure is beyond the straight leg and consequently will be carved first, and thus in effecting the carving on the work $S^1$ on the opposite table the bent leg is carved before the straight leg; for the reason that the tools are all moving in the same horizontal plane and each tool, no matter at which end of the tool carrier, must obey the follower and pattern.

It is of course apparent that a machine of this character may be constructed with a greater or less number of motors and tools than the number (eight) shown in the drawings. By cutting off the current from one or more of the motors the number of tools in use will be reduced.

What I claim as my invention is:—

1. In a machine of the kind described, work-supporting means, a carriage, means for reciprocating said carriage, an oscillatory frame mounted on said carriage, means for maintaining said frame in horizontal position, tool supports and a follower mounted at the two ends of said frame to oscillate therewith, and a pattern mounted on said work support to be engaged by said follower.

2. In a machine of the kind described, work-supporting means, a carriage, means for reciprocating said carriage, an oscillatory frame mounted in said carriage, means for maintaining said frame in horizontal position, tool supports and a follower mounted at the two ends of the frame to oscillate therewith, a pattern mounted on said work support to be engaged by said follower, and means for keeping said follower and said pattern in engagement.

3. In a machine of the kind described, work-supporting means, a carriage, means for reciprocating said carriage, an oscillatory frame mounted on a vertical axis in said carriage, means for maintaining said frame in horizontal position, tool supports and a follower mounted in said frame, and a pattern mounted on said work support to be engaged by said follower.

4. In a machine of the kind described, work-supporting means, a carriage, means for reciprocating said carriage, an oscillatory frame mounted on a vertical axis in said carriage, means for maintaining said frame in horizontal position, tool supports and a follower mounted in said frame, and a pattern mounted on said work support to be engaged by said follower, said work-supporting means lying in a vertical plane and said follower and said tools operating upon the pattern and work on said work support in a horizontal plane whereby the pressure of said follower and tools on said pattern and work will be unaffected by gravity.

5. In a machine of the kind described, work-supporting means, a carriage located between them, means for reciprocating said carriage, an oscillatory frame mounted in said carriage on a vertical axis, means for maintaining said frame in horizontal position, tool supports and a follower mounted to oscillate therewith, a pattern mounted on said work support to be engaged by said follower, and means for keeping said follower and said pattern in engagement, said means comprising a spring mechanism one element of which is mounted on said frame and the other on said carriage.

6. In a machine of the kind described, work-supporting means, a carriage, means for reciprocating said carriage, an oscillatory frame mounted in said carriage, two sets of tool holders mounted to be rocked in said frame, one set at each end thereof, stationary guideways mounted on said carriage, a frame mounted to slide on said guideways, and connections between said tool holders and said sliding frame whereby the movement of said sliding frame will rock said tool holders.

7. In a machine of the kind described, work-supporting means, a carriage, means for reciprocating said carriage, an oscillatory frame mounted in said carriage, tool holders mounted to be rocked in said frame, stationary guideways mounted on said carriage, a frame mounted to slide on said guideways, connections between said tool holders and said sliding frame whereby the movement of said sliding frame will rock said tool holders, and means for moving said sliding frame at the end of each reciprocation of said carriage.

8. In a machine of the kind described, a carriage, a tool carrier support on said carriage, said tool carrier support comprising an oscillatory frame mounted on a vertical axis, so that it may be oscillated in a horizontal plane only, and means adapted to move said tool carrier support vertically.

9. In a machine of the kind described, a carriage, a plate mounted in fixed position thereon, a tool carrier comprising an oscillatory frame mounted on a vertical axis, means for supporting said frame whereby it may be oscillated, means for holding said supporting means in parallel relation with said plate, means adapted to move said tool carrier vertically, and means for so moving it intermittently.

10. In a machine of the kind described, a carriage, a plate mounted in fixed position thereon, a tool carrier comprising an oscillatory frame, means for supporting said frame whereby it may be oscillated, means for holding said supporting means in parallel relation with said plate, means adapted to move said tool carrier vertically, and means for so moving it intermittently, said means comprising a gear, means connecting said tool carrier therewith whereby the rotation of said gear will control the vertical position of said tool carrier, and means for rotating said gear operable at the end of the reciprocation of said carriage.

11. In a machine of the kind described, a carriage, a plate mounted in fixed position thereon, a tool carrier comprising an oscillatory frame, means for supporting said frame whereby it may be oscillated, means for holding said supporting means in parallel relation with said plate, means adapted to move said tool carrier vertically, and means for so moving it intermittently, said means comprising a gear, means connecting said tool carrier therewith whereby the rotation of said gear will control the vertical position of said tool carrier, and means for rotating said gear operable at the end of the reciprocation of said carriage, said last-named means being adjustable whereby the amount of rotation of the gear may be controlled.

12. In a machine of the kind described, a reciprocating carriage, tool supports movable with said carriage, a series of motors rigidly connected together, driving means whereby the tools mounted in said tool supports may be rotated from said motors, and counterbalancing means for said motors and tool supports.

13. In a machine of the kind described, a reciprocating carriage, a frame having a pivotal connection with said carriage, tool supports and tools carried by said frame, means for yieldingly forcing said tools toward the work, a series of motors mounted on said carriage and rigidly connected together, and driving connections whereby said tools may be rotated from said motors.

14. In a machine of the kind described, a series of motors rigidly connected together, pivotal means for supporting them whereby they may be oscillated, arms rigidly connected to said motors, and tool holders pivotally connected to said arms, tools mounted in said tool holders, a frame adapted to slide with relation to said motors, and connecting rods connecting said sliding frame with said tools.

15. In a machine of the kind described, a carriage, means for reciprocating it horizontally, said carriage comprising a base plate and a top plate, two pairs of brackets, one pair being pivoted on each plate, connections between the corresponding brackets of the two plates, links connecting the free ends of each pair of brackets, each link carrying a socket, a series of motors rigidly connected and carrying tool supports and tools, rods projecting from the top and bottom motors and slidably mounted in said sockets, and flexible means for suspending said motors whereby said tools may be moved together horizontally and vertically by hand.

16. In a machine of the kind described, a carriage, means for reciprocating it horizontally, said carriage comprising a base plate and a top plate, two pairs of brackets, one pair being pivoted on each plate, connections between the corresponding brackets of the two plates, links connecting the free ends of each pair of brackets, each link carrying a socket, a series of motors rigidly connected and carrying tool supports and tools, rods projecting from the top and bottom motors and slidably mounted in said sockets, and flexible means for suspending said motors, posts mounted on said carriage, and a connection between one of said posts and one pair of brackets whereby the movement of said tools will be automatically controlled.

17. In a machine of the kind described, a tool support, a work table and means for supporting it whereby it may be adjusted toward and from said tool support, comprising a frame, segmental racks fixedly attached thereto, swinging brackets mounted on said frame and connected to said table, pinions in mesh with said racks and supported on said brackets, connections between said pinions whereby they will move together, and a single means for moving them whereby when turned they will travel about said racks, and move the table toward or from said frame.

18. In a machine of the kind described, a carriage, means for reciprocating it, a series of rotatable chucks and means for rotating them intermittently comprising a worm gear mounted on each chuck, a shaft carrying worms, one worm engaging each worm gear, and means operatively connected to said shaft adapted to be engaged by means on the stationary frame at each reciprocation of said carriage whereby said shaft will be rotated.

19. In a machine of the kind described, a carriage, means for reciprocating said carriage, an oscillatory frame mounted on said carriage, means for supporting said frame whereby it may be raised and lowered, means for supporting tools and a follower in said frame, and work-supporting means comprising two oppositely-disposed work tables each adapted to carry work to be engaged by said tools and also a pattern to be engaged by said follower, whereby upon the oscillation of said frame said follower will engage the pattern and will cause the reproduction of the pattern and its reverse by the tools.

20. In a machine of the kind described, a carriage, means for reciprocating said carriage, an oscillatory frame mounted on said carriage, means for supporting said frame whereby it may be raised and lowered, means for supporting tools and a follower in said frame, work-supporting means comprising two oppositely-disposed work tables each adapted to carry work to be engaged by said tools and also a pattern to be engaged by said follower, whereby said tools and said follower will engage the work and pattern held by both work tables, and yielding means for holding said tools in contact with the work and said follower in contact with the pattern.

21. In a machine of the kind described, two oppositely-disposed work tables, an oscillatory frame, having a vertical axis of oscillation located midway between said work tables, tool holders mounted in said frame and carrying tools to engage work mounted on both work tables, and a follower also mounted in said frame, means for maintaining said frame in horizontal position, and means whereby the engagement of said follower with a pattern on said work table will cause the engagement of all the tools with the work.

22. A machine adapted to reproduce a pattern and its reverse comprising two oppositely-disposed work tables, an oscillatory frame, having a vertical axis of oscillation located between the planes of said work tables, a follower mounted in said frame, tools mounted on opposite sides of said frame, means for maintaining said frame in horizontal position, and a pattern located to be engaged by said follower.

23. A machine of the kind described comprising a stationary work table, a carriage, means for reciprocating said carriage horizontally, said carriage being mounted to oscillate about a vertical axis, means to maintain said frame in horizontal position, tool supports and a follower mounted on said frame to oscillate therewith, a pattern mounted on said work support to be engaged by said follower, and means located in the path of said carriage, whereby the direction of reciprocation of said carriage will be automatically changed.

24. A machine of the kind described comprising two oppositely-located work tables, a carriage located between said work tables, means for reciprocating said carriage, a frame mounted to oscillate about a vertical axis, tool supports and a follower mounted in said frame to oscillate therewith, a pattern mounted on one of said work supports to be engaged by said follower, and means located in the path of said carriage whereby the direction of reciprocation of said carriage will be automatically changed.

JOSEPH JANES.

Copies of this patent may be obtained for five cents each, by addressing the "Commissioner of Patents, Washington, D. C."